United States Patent [19]

Aramaki

[11] Patent Number: 4,768,013
[45] Date of Patent: Aug. 30, 1988

[54] METHOD AND APPARATUS FOR DIAGNOSING FAILURE IN IDLE SWITCH FOR INTERNAL COMBUSTION ENGINES

[75] Inventor: Takashi Aramaki, Yokohama, Japan

[73] Assignee: Nissan Motor Company, Limited, Yokohama, Japan

[21] Appl. No.: 68,492

[22] Filed: Jul. 1, 1987

[51] Int. Cl.⁴ .................. B60Q 1/00; F02M 51/00
[52] U.S. Cl. .................. 340/52 R; 123/479; 123/339; 307/10 R
[58] Field of Search .......... 340/52 R, 52 F, 671, 340/679; 123/479, 320, 339, 490, 494; 364/431.09, 431.1, 431.11; 307/10 R

[56] References Cited

U.S. PATENT DOCUMENTS

| | | | |
|---|---|---|---|
| 4,531,490 | 7/1985 | Kishi et al. | 123/479 |
| 4,580,220 | 4/1986 | Braun et al. | 123/479 |
| 4,583,176 | 4/1986 | Yamato et al. | 123/479 |

Primary Examiner—Donnie L. Crosland
Attorney, Agent, or Firm—Pennie & Edmonds

[57] ABSTRACT

A method and apparatus for diagnosing a presence or absence of failure in an idle switch installed in an internal combustion engine in which, a throttle valve of an internal combustion engine is associated with the idle switch. The throttle valve installed in the engine is usually displaced to a fully closed while the engine at least once is during each period of continuous operation, a counter is advanced whenever the engine has started and is cleared when receiving an activation signal from the idle switch, if the idle switch functions normally, a count value of the counter reaches zero by the time the engine has stopped. If the idle switch fails, the count value is advanced whenever the engine is operated and no signal from the idle switch is received. When the count value reaches a predetermined value, an alarm informing the failure of the idle switch is produced.

13 Claims, 2 Drawing Sheets

METHOD AND APPARATUS FOR DIAGNOSING FAILURE IN IDLE SWITCH FOR INTERNAL COMBUSTION ENGINES

BACKGROUND OF THE INVENTION

The present invention relates generally to a method and apparatus for diagnosing failure in an idle switch installed in an internal combustion engine. The idle switch is provided to detect and indicate the fully closed state of a throttle valve installed in a throttle chamber in an intake passage of the internal combustion engine.

An activation signal derived from the idle switch indicative of the fully closed state of the throttle valve is an essential factor to indicate that the idling engine is and to determine the correct amount of fuel to be fed to the engine when it is idling or decelerating with the throttle valve closed.

Hence, when such failures as insufficient contact or a broken line in the idle switch occur, proper control of the fuel injection quantity becomes impossible and accordingly undesirable exhaust gas components increase. In addition, the driver of the vehicle in which the engine is mounted cannot easily notice such kinds of failure.

Recently, the demand for a self-diagnosis system by which self-diagnosis for such kinds of failures can be carried out to indicate presence of such failures or to store information indicating the presence of such failures in a memory so as to simplify inspection and repair has been felt.

A Japanese document titled "M-TEU engine service manual" published on January, 1984 by Toyota Jidosha kabushiki kaisha exemplifies the above described diagnosing apparatus.

In the above-identified Japanese document, a full open switch which turns to ON and generates an On signal when the throttle valve is in a fully open state is used and the idle switch diagnosing apparatus indicates that the idle switch has failed if both ON signals of the idle switch and full open switch are simultaneously received.

However, the above-described idle switch diagnosing apparatus cannot clearly distinguish the failure of the idle switch from that of the full open switch. In addition, it cannot diagnose the condition of the idle switch when the idle switch cannot generate the ON signal because it is not being operated or there is a broken line in the idle switch.

SUMMARY OF THE INVENTION

It is an object of the present invention to provide a method and apparatus for easily and quickly diagnosing failure of the idle switch.

It is another object of the present invention to provide an apparatus and method for accurately diagnosing failure in the idle switch when the idle switch cannot produce the ON signal due to nonoperation of or a broken line in the idle switch.

The above-described objects can be achieved by providing an apparatus, comprising: (a) first means for detecting whether an internal combustion engine has times the engine has started on the basis of the information obtained by the first means, the second means being cleared in response to an activation signal of an idle switch indicating that an engine speed adjusting mechanism of the engine causes the engine in an idle state; (c) third means for comparing the counted value of the second means with a predetermined value; and (d) fourth means for determining whether the idle switch has failed on the basis of the result of the comparison by the third means.

The above-described objects can be achieved by providing an apparatus, comprising: (a) first means for detecting the state (open or closed) of a throttle valve installed in an intake passage of an internal combustion engine, and outputting an activation signal indicative thereof, the throttle valve being associated with an accelerator of a vehicle; (b) second means for detecting a start of the internal combustion engine, and outputting a signal indicative thereof; (c) third means for counting a number of times the engine has started from the number of signals derived from the second means, the third means being cleared in response to the activation signal outputted from the first means; (d) fourth means for determining if the first means has failed on the basis of a value counted by the third means.

The above-described objects can be achieved by providing a method for detecting failure of a component of a vehicular engine, comprising the steps of: (a) detecting whether the engine has started; (b) counting the number of times the engine has started as detected in step (a); (c) clearing the counted value counted in the step (b) when receiving a signal from an idle switch to indicate that a throttle valve of the engine is in a fully closed state; (d) determining whether the counted value counted in the step (b) reaches a value equal to a predetermined value; (e) producing an alarm indicating that the idle has switch failed upon determination in the step (d) that the counted value derived in the step (b) has reached as value equal to the predetermined value.

DETAILED DESCRIPTION OF THE PREFERRED EMBODIMENT

Reference will hereinafter be made to the drawings in order to facilitate understanding of the present invention.

Figure 1:
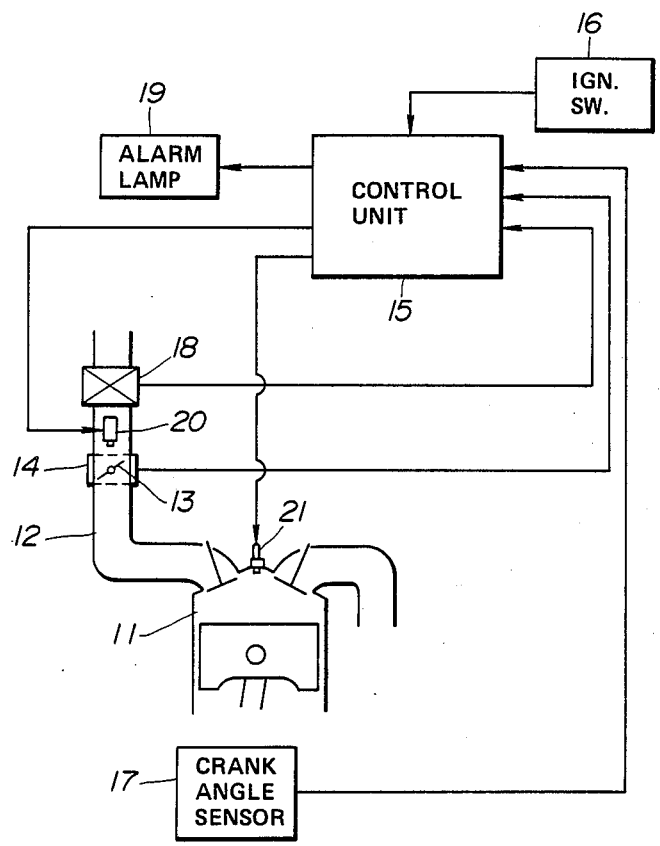
FIG. 1 is a circuit block diagram of a preferred embodiment of an appratus for diagnosing failure in an idle switch of an internal combustion engine according to the present invention.

FIG. 1 shows a preferred embodiment of to the present invention.

An idle switch 14 is installed in connection with a throttle valve 13. The throttle valve 13 is installed in an intake passage 12 of an internal combustion engine generally designated by 11. The throttle valve 13 is used to adjust air flow rate of intake air sucked into a cylinder of the engine 11, and is preferably linked with an accelerator pedal of a vehicle in which the engine 11 is mounted. The idle switch 14 serves to detect when the throttle valve 13 is in a fully closed state and is activated to produce an ON signal when the throttle valve 13 is fully closed, e.g., when the associated accelerator pedal is released. The ON signal of the idle switch 14 is transmitted to a control unit 15. The control unit 15 receives an ignition ON signal form an ignition switch 16. The ignition switch 16 is a key switch operated by an operator. The control unit 15 also receives an engine revolution speed signal from a crank angle sensor 17.

The crank angle sensor 17 is exemplified by a U.S. Pat. No. 4,656,993 issued on Apr. 14, 1987, the disclosure of which is hereby incorporated by reference.

The control unit 15 furthermore receives an air flow rate signal from an air flow sensor 18. The control unit 15 outputs an alarm signal to an alarm unit such as alarm lamp 19 installed preferably on the driver's side of the vehicle when the unit 15 determines that the idle switch 14 has failed.

The control unit 15 also outputs an injection signal to a fuel injector 20 to control a quantity and injection timing of fuel supplied to the engine 11 via the fuel injector 20 and also outputs an ignition signal to a spark plug 21 installed in each of engine cylinders to control an ignition timing.

The control unit 15 comprises a microcomputer which executes injection quantity control, ignition timing control, and so on the basis of the signal output of the crank angle sensor 17 and air flow meter 18, and idle switch 14 and diagnoses failure of the idle switch 14 and turns on the alarm lamp 19 failure of the idle switch 14 is determined.

Figure 2:
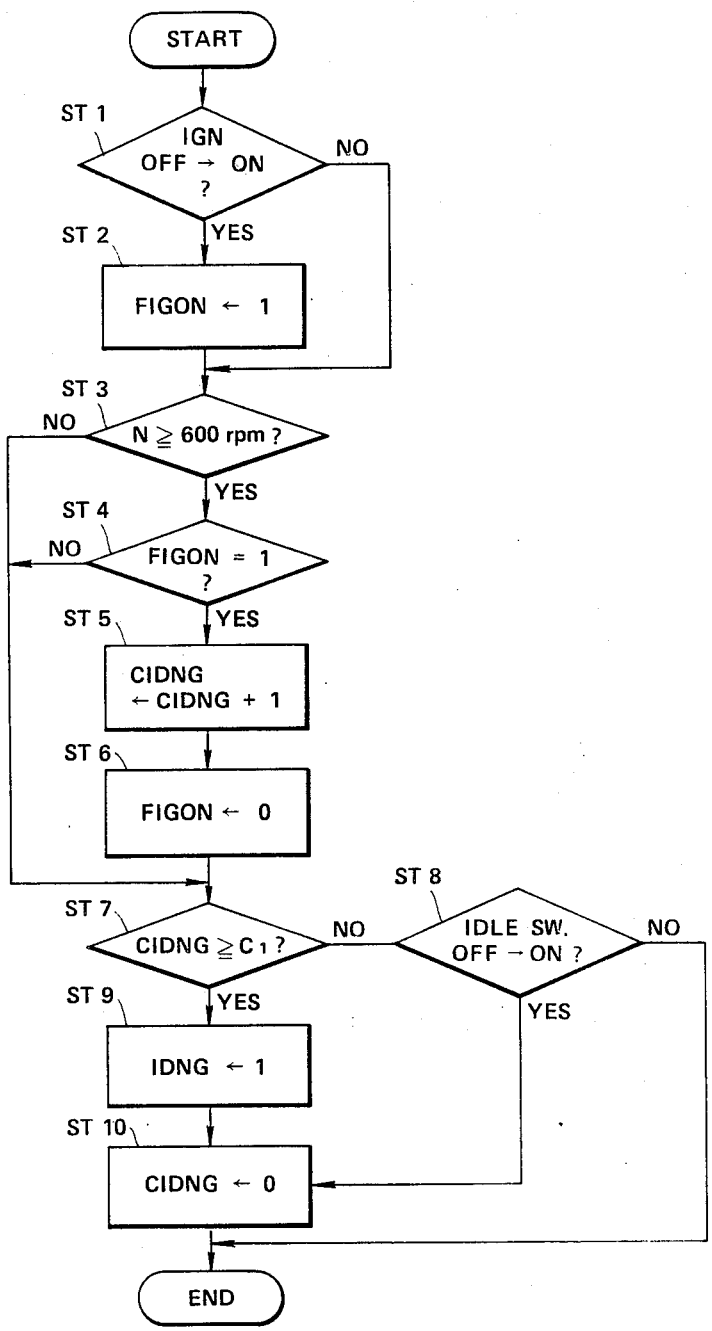
FIG. 2 is a flowchart of a trouble diagnose routine executed in the preferred embodiment shown in FIG. 1.

FIG. 2 shows a flowchart representing a diagnostic routine which the control unit 15 executes for detecting failure in the idle switch 14.

It is noted that the microcomputer constituting the control unit 15 includes a CPU (Central Processing Unit), I/O unit (Input/Output), ROM (Read Only Memory), and RAM (Random Access Memory).

In steps ST1 to ST4, the control unit 15 determines whether the engine 11 has been started on the basis of a switching of the ignition switch 16 from OFF to On state and engine revolution speed.

More specifically, in the step ST1, the control unit 15 detects if the signal outputted from the ignition switch 16 has changed from the OFF state to the ON state. If YES in step ST1, the routine goes to step ST2 in which a flag FIGON is set to "1" and then goes to step ST3 in which the control unit 15 determines whether the engine speed detected by the crank angle sensor 17 is equal to or more than 600 rpm. If YES in step ST3, the routine goes to step ST4 is which the control unit 15 determines whether the flag FIGON is set to "1". If YES in step ST4, the routine goes to step ST5 in which a counter CIDNG is advanced by one (CIDNG←CIDNG+1). Hence, whenever the engine 11 is started, the count valve of counter CIDNG is sequentially advanced. However, the count valve of counter CIDNG remains unchanged when mere repetition of ON and OFF of the ignition switch 16 is carried out with no complete start of the engine 11. In a step ST6, the control unit 15 resets the flag FIGON to "0". Next, in a step ST7, the control unit 15 determines whether the count valve of the counter CIDNG exceeds a predetermined valve $C_1$ as will be described later. In a step ST8, the control unit 15 determines the presence or absence of the activation signal of the idle switch 14, to specifically determine whether the signal outputted from the idle switch 14 has changed from the OFF state to the ON state. When the throttle valve 13 is returned from its open state to its fully closed state, the change of the signal derived from the idle switch 14 from the OFF state to the ON state is detected provided that the idle switch 14 functions normally. If YES in the step ST8, the routine goes to a step ST10 in which the counter CIDGN is cleared. Hence, if the idle switch 14 functions normally, the value of the counter CIDNG is held at a value of "1" of "0" and may indicate at least "0" when the engine stops.

On the contrary, if the idle switch 14 fails, the counter CIDGN is advanced as the engine 11 each time the engine is started. Therefore, in the step ST7, the control unit 15 compares the counted value from the counter CIDGN with the predetermined value $C_1$ (for example, three, four, or five). If CIDGN $\geq C_1$ (YES) in the step ST7, the control unit 15 determines that the idle switch 14 has failed and stores a value of IDING which is set to "1" in a memory. Then, the control unit 15 outputs the signal to the alarm lamp 19 to turn on the alarm lamp 19. The stored content described above is not erased even if the ignition switch 16 is turned off (non-volatile memory is used).

Although in the example shown in FIG. 3 the count value of the counter CIDNG is cleared when the signal derived from the idle switch 14 changes from the OFF state to the ON state, alternatively it may be cleared upon change thereof from the ON state to the OFF state. Alternatively, since there are many cases where the signal is continuously derived from the idle switch 14 due to a broken line in the idle switch 14, the counter CIDNG may be cleared when the ON signal from the idle switch 14 is detected.

As described hereinabove, since the idle switch failure diagnosing method and apparatus according to the present invention can accurately detect failure in the idle switch due to insufficient contact in the idle switch or a broken line thereof and can activate an alarm, deterioration the quality of exhaust gas composition and reduction of fuel economy due to the failure in the idle switch can be avoided.

It will clearly be appreciated from those skilled in the art that the foregoing description is made in terms of the preferred embodiment and various changes and modifications may be made without departing from the scope of the present invention which is to be defined by the appended claims.

What is claimed is:

1. An apparatus, comprising:
    (a) first means for detecting whether an internal combustion engine has started;
    (b) second means for counting the number of times the engine has started on the basis of detections by the first means, the second means being cleared in response to an activation signal of an idle switch indicating that an engine speed adjusting mechanism of the engine causes the engine in an idle state;
    (c) third means for comparing the counted value of the second means with a predetermined value; and
    (d) fourth means for determining that the idle switch has failed on the basis of the results of the comparison made by the third means.

2. An apparatus as set forth in claim 1, wherein the fourth means produces an alarm upon determination that the idle switch has failed when the third means determines that the counted value of the second means exceeds the predetermined value.

3. An apparatus as set forth in claim 2, wherein the fourth means turns an alarm lamp on.

4. An apparatus as set forth in claim 1, wherein the engine speed adjusting mechanism comprises a throttle value and the throttle valve is linked with an accelerator member of a vehicle in which the engine is mounted.

5. An apparatus as set forth in claim 1, wherein the second means is cleared when the signal derived from the idle switch is changed from an ON state thereof to an OFF state thereof.

6. An apparatus as set forth in claim 1, wherein the second means is cleared when the signal derived from the idle switch is changed from an OFF state to an ON state.

7. An apparatus as set forth in claim 1, wherein the first means comprises: (a) fifth means for detecting whether an ignition switch of the engine is changed from its OFF state to its ON state; (b) sixth means for detecting an engine revolution speed; and (c) seventh means for determining whether the engine revolution speed exceeds a predetermined speed upon detection by the fifth means that the ignition switch is cahnged from its OFF state to its ON state.

8. An apparatus, comprising:
   (a) first means for detecting if a throttle valve, installed in an intake passage of an internal combustion engine, is in a fully closed state, and outputting an activation signal indicative thereof;
   (b) second means for detecting starting of the internal combustion engine and outputting a signal indicative thereof;
   (c) third means for counting a number of times the engine has started from the number of signals derived from the second means, the thrid means being cleared in response to the activation signal outputted from the first means;
   (d) fourth means for determining if the first means has failed on the basis of the counted value of the third means.

9. An apparatus as set forth claim 8, wherein the fourth means compares the count value of the third means with a predetermined value and concludes that the first means has failed when the counted value of the third means equals or more than the predetermined value.

10. An apparatus as set forth in claim 9, wherein, the predetermined value is at least three.

11. The apparatus according to claim 8, which further comprises fifth means for storing a signal indicating that the first means has failed when the fourth means determines that the first means fails, wherein and the signal stored by the fifth means is not erased when the engine stops.

12. The apparatus according to claim 8, wherein the fourth means further comprises fifth means for producing an alarm upon determination that the first means has failed.

13. A method for monitoring a sensing means of a vehicular engine, comprising the steps of:
   (a) detecting whether the engine has started;
   (b) counting the number of times the engine has started on the basis of the detected result in step (a);
   (c) clearing a count value counted in step (b) upon receiving a signal from an idle switch to indicate that a throttle valve of the engine is fully closed;
   (d) determining whether said counted value obtained in step (b) reaches a value equal to a predetermined value;
   (e) producing an alarm indicating that the idle switch has failed upon determination in the step (d) that the count value counted in the step (b) reaches a value equal to the predetermined value.

* * * * *